Patented May 1, 1951

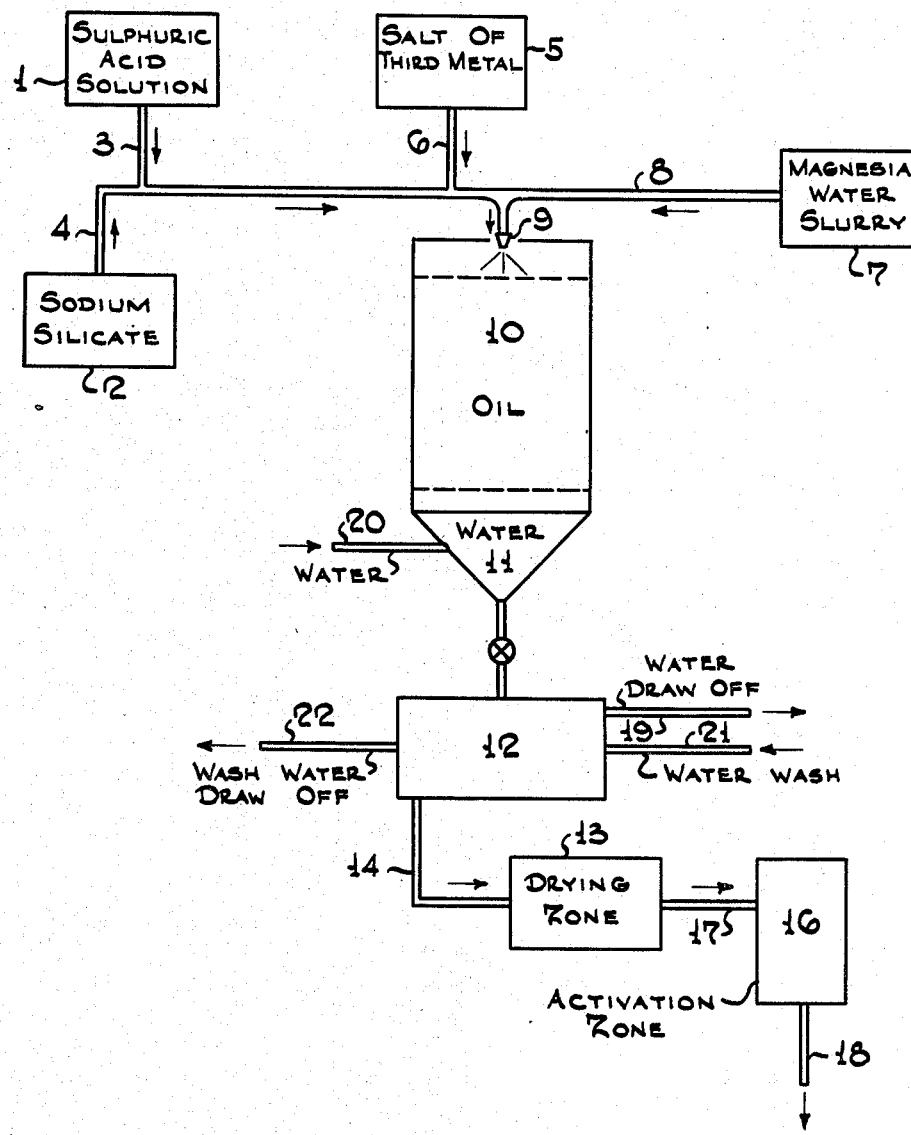

2,551,015

UNITED STATES PATENT OFFICE 2,551,015

PREPARATION OF CATALYSTS CONTAINING SILICA AND A METAL OXIDE AND WITH OR WITHOUT MAGNESIA

Charles N. Kimberlin, Jr., and Julius P. Bilisoly, Baton Rouge, La., assignors to Standard Oil Development Company, a corporation of Delaware Application May 21, 1946, Serial No. 671,319

6 Claims. (Cl. 252—457)

The present invention is concerned with a process for the preparation of improved catalysts. It more specifically relates to the preparation of improved catalysts suitable for use in cracking, reforming, isomerization, polymerization, and alkylation processes. Our invention is particularly concerned with an improved method for preparing granular and spherical catalysts comprising silica and a metal oxide such as silica-manganese oxide and silica-manganese oxide-magnesia. In accordance with our invention magnesia, as distinguished from the metal oxide, is added to silica hydrosol impregnated with the salt of a metal oxide, followed by washing with water at an elevated temperature.

It is well known in the art to improve the quality of oils, particularly petroleum oils, by treating the same with catalysts under various operating conditions. For example, it is known to treat high boiling petroleum oils with a silica-manganese oxide-magnesia catalyst, a silica-zirconium oxide-magnesia catalyst, or a silica-beryllium oxide-magnesia catalyst at temperatures in the range from about 600° F. to about 1100° F. in order to crack the oil and to secure petroleum oil fractions boiling in the motor fuel boiling range.

Heretofore, these catalysts have been prepared by various procedures. One method employed for the preparation is to prepare silica hydrogel by the mixing of an alkali silicate and an acid. The hydrogel is washed and soaked in a solution containing a salt of magnesium and of manganese, beryllium or of zirconium. The concentration of the solution with respect to the two salts is adjusted to give the desired composition of the final catalyst. After this impregnation, the hydrogel is treated with a solution of ammonia to precipitate the magnesia and the hydrous oxide of manganese, beryllium, or zirconium within the gel structure. The hydrogel is finally washed free of soluble salts and dried. Another method utilized for the preparation of these catalysts is to prepare a silica hydrogel by mixing silicate and acid. The silica hydrogel is washed and then intimately mixed by grinding with magnesia and the hydrous oxide of manganese, beryllium, or zirconium. The catalyst is aged for a period of from 24 to 72 hours. Elevated temperatures have been employed in which cases the aging period has been reduced to from 5 to 10 hours. The catalyst is dried at a temperature in the range from about 200° F. to 270° F.

These methods known in the art for the preparation of catalysts comprising silica of this character are quite complicated and cumbersome. We have discovered an improved process for the preparation of these catalysts by which they may be readily prepared with a high degree of purity.

We have now discovered that providing our process is employed a very desirable catalyst is produced. In accordance with our invention, magnesia is added to a silica hydrosol impregnated with a salt of a metal characterized by the ability to form the hydrous oxide upon addition of magnesia to the silica hydrosol, followed by water washing preferably at an elevated temperature. By operating in this manner the time necessary for the hydrosol to set to a hydrogel is materially reduced. Furthermore our process possesses definite advantages over previous preparations involving operations such as milling, ammoniation, and the like.

In accordance with our invention our catalysts are prepared by adding magnesia, preferably as a slurry in water, to a silica sol which has been impregnated with a salt of a metal characterized by the ability to form the hydrous oxide upon addition of magnesia to the silica hydrosol. The action of the magnesia is to neutralize the free acid, thus causing rapid setting of the hydrosol to the hydrogel, and also to decompose the salt of the metal causing precipitation of the metal oxide within and throughout the gel. Excess magnesia used over these requirements remains in the finished product and forms a three component catalyst comprising silica, magnesia, and the added metal oxide.

In our co-pending application Serial No. 669,891 filed May 15, 1946, we have described and claimed the preparation of silica-magnesia, silica-alumina, and silica-magnesia-alumina catalysts by methods similar to those employed in the present invention.

The process of our present invention may be more readily understood by the following examples illustrating modifications of the same.

Example 1

A sodium silicate ($Na_2O \cdot 3.25 SiO_2$) solution having a specific gravity of 1.21 was mixed with a sulfuric acid having a specific gravity of 1.19. Approximately 667 cc. of the sodium silicate solution was mixed with 333 cc. of the sulfuric acid solution.

The silica hydrosol was impregnated with manganese sulfate by the addition of 41 cc. of a 3 N manganese sulfate solution. A water slurry of magnesia was prepared by the addition of 102 parts by weight of finely divided calcined magnesia to 200 parts by weight of water and added to the silica sol. The hydrogel formed from the hydrosol in about 3 minutes.

The hydrogel was transferred to water, washed with distilled water at 150° F. until it was free of the sulfate ion. The hydrogel was dried in a steam oven and activated by heating at 1250° F.

The catalyst prepared in accordance with this procedure had the following composition:

|  | Per cent |
|---|---|
| Manganese oxide | 2 |
| Magnesia | 38 |
| Silica | 60 |

Example 2

A silica sol was prepared with sodium silicate and sulfuric acid in a manner described with respect to Example 1.

To this sol was added 90 cc. of 10% zirconyl nitrate solution (zirconium oxy-nitrate,

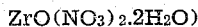

$ZrO(NO_3)_2.2H_2O)$

A magnesia slurry comprising 102 grams of magnesia in 200 cc. of water was added to the impregnated silica sol. The sol set to a gel, which gel was washed and dried. The catalyst produced had the following composition:

|  | Per cent |
|---|---|
| Silica | 60 |
| Magnesia | 38 |
| Zirconium oxide | 2 |

Example 3

A silica hydrosol was prepared as described in Example 1 by mixing sodium silicate and sulfuric acid. To this sol was added 110 cc. of beryllium nitrate solution having specific gravity of 1.13.

A magnesia slurry was prepared by adding 105 grams of magnesia to 200 cc. of water. This magnesia slurry was added to the impregnated silica sol. The hydrogel was formed, washed, and dried. The catalyst had the following composition:

|  | Per cent |
|---|---|
| Silica | 60 |
| Magnesia | 38 |
| Beryllium oxide | 2 |

The process of our invention may be readily employed either for the manufacture of granules or microspheres. A procedure for the manufacture of microspheres is shown by a drawing illustrating a preferred modification.

Sulfuric acid solution is maintained in reservoir 1 while sodium silicate is maintained in reservoir 2. The sulfuric acid is withdrawn from reservoir 1 by means of line 3 and mixed with the sodium silicate which is withdrawn from reservoir 2 by means of line 4. The salt of the third metal is maintained in reservoir 5 and is introduced into the sodium silicate solution in line 4 by means of line 6.

A water slurry of magnesia is maintained in reservoir 7. This slurry is withdrawn from reservoir 7 by means of line 8 and combined with the silica solution through mixing spray nozzle means 9. The sol is sprayed into the upper level of an oil bath 10. The catalyst falls downwardly through oil bath 10 and flows into a water bath 11. Water which is introduced into zone 12 from zone 11 with the catalyst may be removed from the system by means of line 19. Water is replenished in zone 11 by introducing water by means of line 20. The catalyst is washed with water in zone 12 which is introduced by means of line 21 and removed by means of line 22. It is preferred that the catalyst be washed with water at a temperature in the range from about 125° F. to 200° F., preferably at about 150° F. The catalyst is passed to zone 13 by means of line 14 wherein it is dried. The catalyst is introduced into zone 16 by means of line 17 wherein it is activated. The finished catalyst is withdrawn from activation zone 16 by means of line 18.

The process of our invention may be widely varied. Our process essentially comprises in its broadest scope the preparation of a silica gel catalyst impregnated with a metal oxide. This is accomplished by the neutralization of the impregnated silica hydrosol with a water slurry of magnesia. The silica hydrosol is impregnated with a salt of a metal. If it is desired to secure a silica-metal oxide catalyst, only sufficient magnesia slurry should be added to neutralize the acidic sol and to decompose the metal salt. In this case the gel contains the metal oxide distributed uniformly throughout the gel. However, if a silica-metal oxide magnesia catalyst is desired in accordance with our process an excess of magnesia water slurry is added to the impregnated silica sol.

The relative composition of the ingredients used in accordance with our process may be varied considerably. In general it is preferred that the composition of the constituents be controlled so that a final catalyst will comprise about 25 to 33% of magnesia. It is desired that the metal oxide concentration be in the range from about 0.5 to 5%. If the catalyst consists of only silica and the metal oxide, it is preferred that the concentration of the metal oxide be in the range from about 10 to 15%.

The advantages of catalyst of this character can be seen by reference to the following table wherein a number of catalysts in various concentrations were prepared and utilized in various operations for the cracking of petroleum oils boiling in the gas oil boiling range.

*Three component catalysts by direct addition of magnesia to impregnated silica hydrosol 38% MgO*

[Cracking tests, 850° F., 0.6 v./v./hr., atmos. press., 2 hr. cycles.]

| Metal Oxide | Activated at 1250° F., Avg. Per cent D+L [1] | Heated 3 Hrs. at 1400° F., Avg. Percent D+L [1] | Steamed 24 Hrs. 1050° F. 60 p. s. i. g., Avg. Percent D+L [1] |
|---|---|---|---|
| None | 27 | 2.5 | 4 |
| 2% ZnO | 25 |  |  |
| 2% ZrO₂ | 53 | 50 | 43 |
| 2% BeO | 48 | 31.5 | 45 |
| 2% MnO | 53 | 36 | 41 |
| 2% TiO₂ | 53 |  |  |
| 2% CdO | 47 |  |  |
| 0.5% Fe₂O₃ | 54 |  | 16.5 |
| 2% Fe₂O₃ | 49 |  | 21 |
| 2% Cr₂O₃ | 41 |  |  |
| 0.5% Cr₂O₃ | 49 |  | 31 |
| 2% CuO | 13 |  |  |

[1] Percent of hydrocarbons in the liquid product boiling below 400° F.

The amount of water used in preparation of the magnesia slurry should be sufficient to wet the magnesia. It is preferred to use at least two parts by weight of water per part by weight of magnesia. The metals employed may vary widely. In general, they are selected from groups 2, 4, 6, and 8 of the periodic table. However, other metals such as copper and manganese are also suitable. Suitable metals in general, which are satisfactory for our process, are metals whose salts are characterized by the ability to form hydrous oxide upon addition of magnesia to silica hydrosol. Suitable metals are for example, manganese, zirconium, beryllium, zinc, titanium, cadmium, chromium, copper and iron. Particularly desirable cracking catalysts comprise the oxides of manganese, zirconium, beryllium, and titanium. The preferable dehydrogenation and reforming catalysts comprise the oxides of zinc, cadmium, copper, iron, and chromium.

The metal salt may be any salt which is characterized by being susceptible to decomposition to the hydrous oxide in a silica sol upon addition of the water slurry of magnesia. Satisfactory salts are for example, the sulfates, the chlorides, and the nitrates of the metals enumerated above.

When finely divided highly calcined magnesia is used with a silica sol containing approximately 140 grams of silica oxide and 33 grams of sulfuric acid per liter, the time of set at approximately 80° F. initial temperature is about 2 minutes. When less highly calcined magnesia is employed, the time of set is shortened, being approximately instantaneous with finely divided hydrated magnesia. Due to the short set time, a preferred method of mixing the hydrosols and the magnesia slurries is carried out by means of a fluid mixing spray nozzle. The process is particularly advantageous for the formation of catalyst in granular form or in spherical form secured by spraying the mixture into an oil bath.

The catalyst is preferably washed at elevated temperatures in the range from about 125° F. to 200° F. Very desirable results are secured when washing at temperatures of about 150° F. The catalyst is preferably dried at a temperature of from 200 to 230° F. and then activated at a temperature of from 1100° F. to 1400° F., or dried and activated at a temperature of 1100° F. to 1400° F.

The process of our invention is not to be limited by any theory as to mode of operation, but only in and by the following claims.

What we claim is:

1. Improved process for the preparation of a catalyst comprising silica which comprises preparing an acidic silica hydrosol, impregnating said silica hydrosol with a salt of a metal characterized by the ability to form the hydrous oxide upon addition of magnesia to the silica hydrosol, adding thereto an aqueous slurry of magnesia in excess over that required to neutralize the acidic hydrosol and to precipitate the metal salt as the oxide, thereby converting by a single step the silica hydrosol into a silica hydrogel-metal oxide-magnesia catalyst, washing said hydrogel catalyst and drying the same.

2. Process as defined by claim 1 in which said hydrogel is washed at a temperature in the range from about 125° F. to 200° F.

3. Process as defined by claim 1 in which said catalyst is washed at a temperature in the range from about 125° F. to 200° F. and dried at a temperature in the range from about 1100° F. to 1400° F.

4. Improved process for the preparation of a catalyst comprising silica which comprises preparing an acidic silica hydrosol, impregnating said silica hydrosol with a salt of a metal characterized by the ability to form the hydrous oxide upon addition of magnesia to the silica hydrosol, adding thereto an aqueous slurry of magnesia sufficient to neutralize the free acid and to precipitate the metal salt as the oxide, thereby converting by a single step the silica hydrosol into a hydrogel catalyst comprising silica and a metal oxide, washing said hydrogel catalyst and drying the same.

5. Process as defined by claim 4 in which said hydrogel is washed at a temperature in the range from about 125° F. to 200° F.

6. Process as defined by claim 4 in which said catalyst is washed at a temperature in the range from about 125° F. to 200° F. and dried at a temperature in the range from about 1100° F. to 1400° F.

CHARLES N. KIMBERLIN, JR.
JULIUS P. BILISOLY.

REFERENCES CITED

The following references are of record in the file of this patent:

UNITED STATES PATENTS

| Number | Name | Date |
|---|---|---|
| 1,762,228 | Holmes | June 10, 1930 |
| 1,772,055 | Miller et al. | Aug. 5, 1930 |
| 1,900,859 | Connolly et al. | Mar. 7, 1933 |
| 2,242,488 | Thacker | May 20, 1941 |
| 2,308,792 | Thomas | Jan. 19, 1943 |
| 2,340,934 | Connolly | Feb. 8, 1944 |
| 2,384,945 | Marisic | Sept. 18, 1945 |
| 2,384,946 | Marisic | Sept. 18, 1945 |
| 2,389,378 | Marisic | Nov. 20, 1945 |
| 2,390,556 | Ruthruff | Dec. 11, 1945 |
| 2,395,875 | Kearby | Mar. 5, 1946 |
| 2,396,758 | Stratford | Mar. 19, 1946 |
| 2,399,261 | Thomas | Apr. 30, 1946 |
| 2,405,408 | Connolly | Aug. 6, 1946 |

FOREIGN PATENTS

| Number | Country | Date |
|---|---|---|
| 504,614 | Great Britain | Apr. 24, 1939 |